United States Patent [19]

Sikora

[11] Patent Number: 4,484,567
[45] Date of Patent: Nov. 27, 1984

[54] HEAT RECOVERY GLAZING

[76] Inventor: Paul T. Sikora, Malarane, Reenascreena, Rosscarbery, County Cork, Ireland

[21] Appl. No.: 354,676

[22] Filed: Feb. 4, 1982

[30] Foreign Application Priority Data

Mar. 5, 1981 [IE] Ireland .................................. 475/81

[51] Int. Cl.³ ................................................ F24J 3/02
[52] U.S. Cl. .................................. 126/431; 237/2 B; 62/235.1; 126/450
[58] Field of Search ............... 126/428, 429, 444, 431, 126/450; 98/31, 33 R, 39; 165/47, 48 S, 57, 108, DIG. 12; 237/2 B; 62/235.11

[56] References Cited

U.S. PATENT DOCUMENTS

| | | | |
|---|---|---|---|
| 1,296,968 | 3/1919 | Klein | 98/38 |
| 2,483,896 | 10/1949 | Gay | 237/2 B |
| 3,412,728 | 11/1968 | Thomason | 126/429 |
| 3,925,945 | 12/1975 | White | 126/429 |
| 4,020,989 | 5/1977 | Kautz | 98/31 |
| 4,069,973 | 1/1978 | Edwards | 98/31 |
| 4,123,003 | 10/1978 | Winston | 126/444 |
| 4,143,815 | 3/1979 | Meysenburg | 237/2 B |
| 4,178,912 | 12/1979 | Felter | 126/431 |
| 4,237,865 | 12/1980 | Lorenz | 126/429 |

FOREIGN PATENT DOCUMENTS

| | | | |
|---|---|---|---|
| 2840018 | 3/1980 | Fed. Rep. of Germany | 126/429 |
| 2408792 | 6/1979 | France | 62/235.1 |

Primary Examiner—Samuel Scott
Assistant Examiner—Noah Kamen
Attorney, Agent, or Firm—Sughrue, Mion, Zinn, Macpeak & Seas

[57] ABSTRACT

A double glazing assembly for a heat extraction system comprises a pair of transparent panels 4,5 and 7,8 in parallel spaced-apart relationship which define a cavity 20 between them. A pair of ports 13 and 14 with substantial spacing permit air entering one of the ports 13 to travel through the cavity 20 and exit from the other port 14.

The assembly is installed in a conservatory 1 attached to one wall 3 of a building 2. The conservatory has a solar aspect and the air inside the conservatory is therefore heated by the sun. Heat is extracted from this air by causing air from the conservatory to flow past the evaporator coil 9 of a heat pump and then into the cavity 20 via the port 13. The air travels through the cavity and emerges back into the conservatory via the port 14. It is shown that in addition to permitting heat to be extracted from the conservatory by the coil 9 one can reduce heat losses from the interior of the conservatory to the outside atmosphere.

11 Claims, 3 Drawing Figures

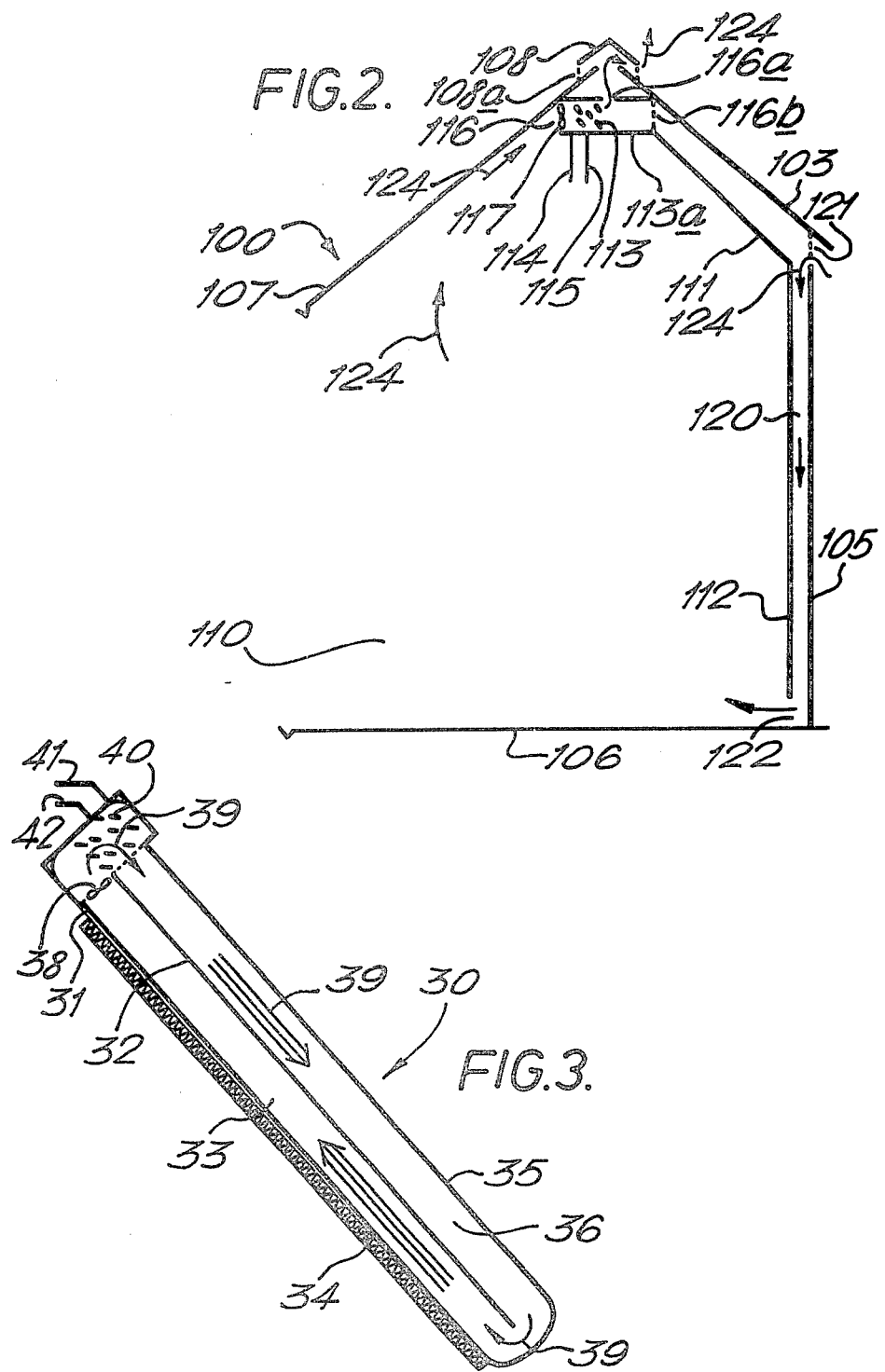

HEAT RECOVERY GLAZING

This invention relates to a method for extracting heat from the air in an enclosure glazed by means of an assembly as hereinafter described while reducing heat losses to the exterior of the enclosure.

In the present invention a double glazing assembly comprises a pair of transparent panels in substantially parallel spaced apart relationship defining a cavity therebetween, and a pair of ports spaced apart by a substantial distance and adapted to enable air entering one of the ports to travel through the cavity and exit therefrom via the other port.

Preferably, the ports are elongated and substantially parallel so as to enable a curtain of air to travel from one port to the other.

The invention therefore provides a method of extracting heat from the air in a heated enclosure having a double glazing assembly as hereinbefore described while reducing heat losses from the enclosure to the exterior through the double glazing assembly wherein the air temperature of the enclosure exceeds the external air temperature, which method comprises providing a heat pump having a heat-collecting element located in the enclosure and a heat-dissipating element located elsewhere, causing a stream of air from the enclosure to flow past the heat-collecting element for cooling thereby, the cooled air stream thereafter entering the cavity of the assembly and travelling therethrough to artificially maintain the air of the cavity at a temperature lower than the equilibrium temperature of still air therein, and returning the air stream emerging from the cavity to the enclosure.

The equilibrium temperature of the still air may be defined as the mean air temperature of the same cavity when there is no net air motion through it.

Preferably the enclosure is a room for human occupation; more preferably a conservatory. In such a case the heat source for the enclosure is preferably solar energy and the enclosure therefore has a solar aspect.

Alternatively the enclosure may be a gap between the absorber and the glazing layer of a solar collector. The absorber may or may not comprise part of the fabric of a building.

Preferably, the air stream is caused to flow past the heat-collecting element and into the cavity by means of a fan and suitable ducting.

Preferably the heat-collecting element of the heat pump comprises an evaporator coil and the heat-dissipating element comprises an evaporator coil and the heat-dissipating element comprises a condenser coil. The condenser coil is preferably located in a water cylinder, warm water from which is circulated in a conventional manner for the purpose of space heating for example.

The invention will now be described by way of example only with reference to the accompanying drawings in which:

FIG. 1a is a schematic diagram showing a condenser coil immersed in a cylinder.

FIG. 2 is a side elevation sectional view of a second conservatory; and

FIG. 3 is a cross-sectional view of a solar collector adapted for use according to the invention.

Figure 1:
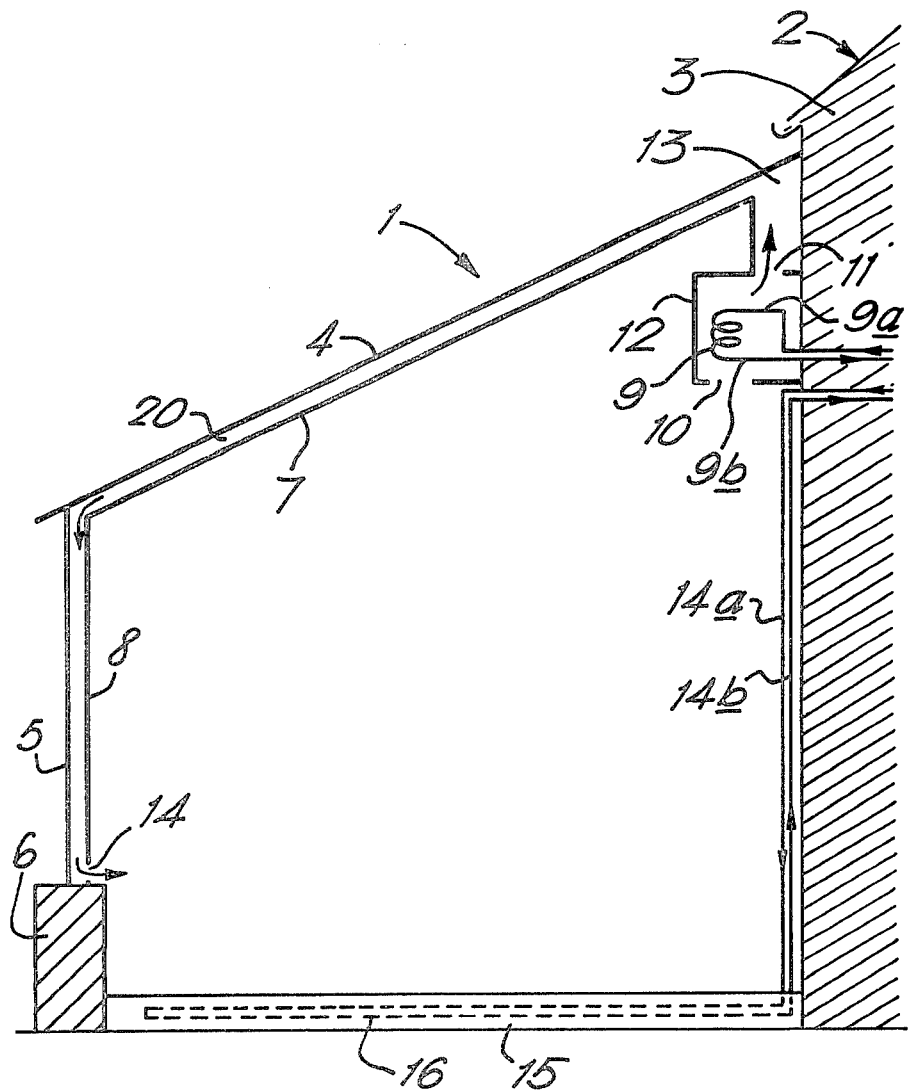
FIG. 1 is a side elevation sectional view of a conservatory.

Referring now to FIG. 1 of the drawings, a conservatory 1 shares a rear wall 3 in common with a building 2 and comprises, in addition to the wall 3, a glass roof panel 4, a glass front wall panel 5 supported by a plinth 6, and a floor 15. The conservatory 1 has a solar aspect.

In use, the conservatory described above functions as a passive heat absorber when subjected to solar radiation and considerable increases in temperature, even for the low intensity radiation experienced in winter months, have been observed. Two additional glass panels 7 and 8 are located in parallel spaced apart relationship with respect to the glass roof panel 4 and the front wall panel 5 respectively which combination defines a cavity 20, the panels 7 and 8 being located inside the conservatory. The panels 7 and 8 may be supported by conventional means independently of the panels 4 and 5, or, together with the roof and wall panels 4 and 5, may form a prefabricated combination unit. At a location near the rear wall 3, the panel 7 stops short of the wall 3 so as to define an inlet port 13 extending across the width of the conservatory. Similarly, the panel 8 stops short of the plinth 6 to define an outlet port 14 also extending across the width of the conservatory parallel to the port 13. Apart from at the ports 13 and 14 the cavity is sealed around its edges, i.e. along the adjacent edges of the glass panels 4, 5, 7 and 8.

Located on the rear wall 3 and at the highest point convenient thereon is an evaporator coil 9 of a heat pump connected via pipes 9a and 9b to a condenser coil 17 FIG. 1a of the heat pump which is immersed in a water cylinder 18 located elsewhere in the building 2. The cylinder is connected to, inter alia, under floor heating coils 16 via pipes 14a and 14b. The floor 15 is of massive constructionn and functions as a storage heater.

Surrounding the coil 9 is a housing 12 having an air inlet 10 and an air outlet 11. The outlet 11 is connected by ducting to the inlet port 13. A fan, not shown, located in the housing 12 assists the passage of air over the coil 9 to the inlet port 13. Means (not shown) for draining condensed water vapour to waste are also provided. In use, the air in the conservatory 1 is heated by solar radiation. The warm air rises and some of it enters the housing 12 via the inlet 10. The warm air is cooled by passing over the evaporator coil 9 with the aid of the fan, and flows in the direction of the arrows through the cavity 20. As the cool air passes down the cavity 20, at a uniform speed determined by the fan in the housing 12, it is warmed by the heat loss from the conservatory to the cavity via the glass panels 7 and 8. In this respect it should be noted that the ducting connecting the outlet 11 to the port 13 preferably directs the air as evenly as possible along the length of the port 13 so that the air travels as a curtain of air between the parallel elongated ports 13 and 14. If the air temperature in the cavity is measured at selected locations between the inlet port 13 and the outlet port 14, a temperature gradient will be observed. The heat transfer across a selected small area of the glass panels 7, 8 may be calculated from the formula $Q = UA(T_i - T_c)$ where $Q$ = Rate of heat transfer in watts, $A$ = area of glass under consideration $T_i$ = mean temperature of the enclosure $T_c$ = cavity air temperature at that selected location and $U$ = overall thermal transmittance co-efficient of a single glazing layer in W/m$^{2\circ}$ C.

Similarly, the heat transfer across the glass panels 4 and 5 may be calculated. In that case, $T_i$ is the cavity air temperature at the selected location and $T_c$ is the exterior air temperature.

Provided that the air temperature at the inlet port 13 is less than the external air temperature, then heat transfer will occur from the outside to the cavity. In that case, the air in the cavity is heated both by heat transfer from the enclosure to the cavity and by heat transfer from the outside to the cavity. In this way, the overall heat transfer from the relatively warm enclosure to the cooler exterior is reduced.

The air leaving the cavity at port 14 is now warmer than the air entering the cavity at the port 13. However, its temperature will be lower than the average air temperature of the conservatory with which it mixes.

The quantity of heat available for transfer from the conservatory via the heat pump will depend on a variety of factors. In any event, it will usually be desirable to maintain at least a predetermined average air temperature in the conservatory. Thus allowing for heat loss from the enclosure to the cavity, the residual heat loss from the cavity to the exterior and other fabric losses, it will be appreciated that only excess heat over and above these requirements will be available for heat transfer. Thus, appropriate thermostatic controls, which respond to the fluctuations in air temperature at a selected location in the conservatory, are incorporated into the system for the purpose of controlling the operation of the fan and heat pump. Furthermore, it is desirable to employ means for closing the ports 13 and 14 when the solar energy being supplied is reduced to a level below that at which the heat pump is no longer operative. The conservatory then receives its heat from the heat stored in the floor 15 and it is desirable to reduce the heat loss through the roof 4 and the wall 5 to a minimum.

It is to be understood that the enclosure 1, if large, may be constructed from a plurality of double glazing assemblies each having its own inlet and outlet port, the assemblies being connected in series with the outlet port of one assembly being connected to the inlet port of the next. In such case the inlet port of the first assembly in the series is supplied with cool air from the enclosure, and the outlet port of the last assembly in the series supplies the heated air back to the enclosure. The above embodiment may be regarded as a simple example of this with the panels 4 and 7 constituting a first assembly which is connected at the join of the roof and wall of the conservatory with the panels 5 and 8 constituting a second assembly.

Referring now to FIG. 2 of the drawings, a conservatory 100 comprises a glass roof panel 103, a glass front wall panel 105, a floor 106 and a conventional roof 107 which together form an enclosure 110 which extends to a room in a house (not shown).

The glass roof panel 103 and the conventional roof 107 meet at a ridge cap 108. As described with respect to FIG. 1, two additional panels 111 and 112 are located in parallel spaced apart relationship with respect to the glass front panel 103 and the glass front wall panel 105 so as to define a cavity 120 therebetween. The panels 111 and 112 are supported in a conventional manner. At a location beneath the ridge cap 108 is located an evaporator coil 113 which is connected via pipes 114 and 115 to a condenser coil (not shown) of a heat pump. The ridge cap 108 has shutters 108a which may be opened or closed. Surrounding the evaporator coil 113 is a housing 113a having an air inlet 116, a fan 117 and two air outlets 116a and 116b. The housing 113a is supported in such a fashion as to partition the air space beneath the ridge cap 108 and the enclosure 110. The air outlet 116b is connected to the cavity 120 via shutters (shown in dotted outline at 116b) which may be opened or closed. At the junction between the glass front wall panel 105 and the glass roof panel 103 is a shutter 121 which also may be opened or closed. Finally, the panel 112 stops short of the floor 106 so as to define a port 122.

In use and with the shutters 108a and 121 closed and the shutter at 116b open, the conservatory functions in a manner similar to that described with reference to FIG. 1, i.e. warm air rises and some of it enters the housing 113a via the inlet 116 and the fan 117. The warm air is cooled by passing over the evaporator coil 113 and flows via the air outlet 116b down the cavity 120 where it is warmed by the heat loss from the conservatory to the cavity 120 via the panels 111 and 112. The air leaving the port 122 is now warmer than the air entering the cavity 120 at the port 116b.

However, in the event that the air emerging at the port 122 is cooler than the external air temperature, then the shutter 116b is closed and the shutters 121 and 108a are opened. Thus a circulation system shown by arrows 124 is set up i.e. external air enters the cavity 120 via the port 121, leaves the cavity 120 at the port 122 to enter the general circulation of the enclosure 110; the air passing over the evaporator coils instead of being directed to the cavity 120 is instead passed to the space beneath the ridge 108 and is exhausted from the enclosure 110 via the open shutters 108a. Thus, a fresh air circulation system is operational using the external air instead of recirculated air as the medium to reduce heat loss from the conservatory. It will be appreciated, of course, that the opening and closing of the shutters may be automatic in response to the temperature of the air emerging at the port 122 and the external air temperature.

Referring now to FIG. 3 of the drawings, there is shown a solar collector 30 comprising an absorber 31 and a glazing layer 32 in parallel spaced apart relationship to define an enclosure 33 therebetween. A standard insulation layer 34 is also provided. Situated in parallel spaced apart relationship to the glazing layer 32 is a second glazing panel 35 which together with the glazing layer 32 defines a cavity 36 therebetween. The collector 30 is closed at both ends to form an assembly the arrangement being such that air is free to flow from the cavity 36 to the enclosure 33 and back again. For this to occur, a circulating fan 38 is provided which circulates the air in the direction of arrows 39. Prior to entering the cavity 36 from the enclosure 33, the air passes over the evaporator coil 40 of a heat pump, similar in arrangement to that described with respect to FIG. 1. The evaporator coil is connected to the condenser coil (not shown) of the heat pump via pipes 41 and 42.

In use, the solar collector 30 may be installed as part of the fabric of a building which it is intended to heat or may be situated independently of the building being connected thereto via the pipes 41 and 42. It functions in a manner similar to that described with respect to FIG. 1 insofar as the enclosure or conservatory 1 of FIG. 1 is equivalent to the enclosure 33 of FIG. 3 and the cavity 20 of FIG. 1 is equivalent to the cavity 36 of FIG. 3.

I claim:

1. A method of extracting heat from the air in a heated enclosure having a double glazing assembly, which comprises a pair of inner and outer transparent panels in substantially parallel spaced apart relationship defining a cavity therebetween and a pair of ports spaced apart by a substantial distance and adapted to enable air entering one of the ports to travel through the cavity and exit therefrom via the other port, while reducing heat losses from the enclosure to the exterior through the double glazing assembly wherein the air temperature of the enclosure exceeds the external air temperature, which method comprises providing a heat pump having a heat-collecting element located in the enclosure and a heat-dissipating element located elsewhere, causing a stream of air from the enclosure to flow past the heat-collecting element for cooling thereby, causing the cooled air stream thereafter to enter the cavity of the assembly and travel therethrough so that it is warmed by heat passing from the enclosure through the inner panel into the cavity, thereby (1) to reduce heat losses from the enclosure to the exterior through the double glazing assembly and (2) to artificially maintain the air of the cavity at a temperature lower than the equilibrium temperature of still air therein, and returning the air stream emerging from the cavity to the enclosure.

2. A method as claimed in claim 1 further comprising causing the air to travel through the cavity as a curtain of air at substantially uniform speed.

3. A method as claimed in claim 1 or 2, wherein the enclosure is a room for human occupation.

4. A method as claimed in claim 3, wherein the room is a conservatory.

5. A method as claimed in claim 3, wherein the enclosure is heated by solar energy.

6. A method as claimed in claim 1, wherein the air is caused to flow past the heat-collecting element and into the cavity by means of a fan and ducting which connects a housing containing the heat-collecting element to one port of the double glazing assembly.

7. A method as claimed in claim 1, wherein the heat-collecting element of the heat pump comprises an evaporator coil and the heat-dissipating element comprises a condenser coil.

8. A method as claimed in claim 7, wherein the condenser coil is located in a water cylinder.

9. A method as claimed in claim 8, wherein warm water from the water cylinder is circulated to the enclosure for space heating.

10. A method as claimed in claim 1, wherein the enclosure comprises a plurality of double glazing assemblies connected in series with the outlet port of one assembly connected to the inlet port of the next, the inlet port of the first assembly in the series being supplied with cooled air from the enclosure and the outlet port of the last assembly in the series supplying air back into the enclosure.

11. A method as claimed in claim 4 further comprising heating the room by solar energy.

* * * * *

UNITED STATES PATENT AND TRADEMARK OFFICE
CERTIFICATE OF CORRECTION

PATENT NO. : 4,484,567
DATED : November 27, 1984
INVENTOR(S) : Paul T. Sikora

It is certified that error appears in the above-identified patent and that said Letters Patent is hereby corrected as shown below:

Add the following figure:

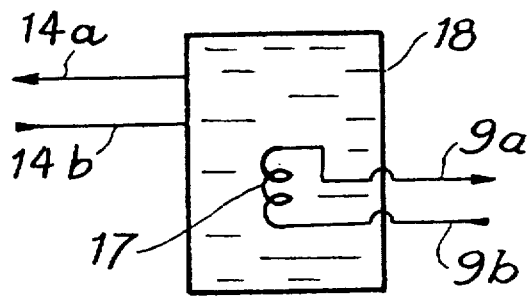

On the title page "3 Drawing Figures should read -- 4 Drawing Figures --.

Signed and Sealed this

Twenty-fourth Day of September 1985

[SEAL]

Attest:

DONALD J. QUIGG

Attesting Officer

Commissioner of Patents and Trademarks—Designate